Feb. 22, 1949.   G. A. DUGGAN   2,462,731
DIVERSION BLIND FITTING
Filed Oct. 24, 1946
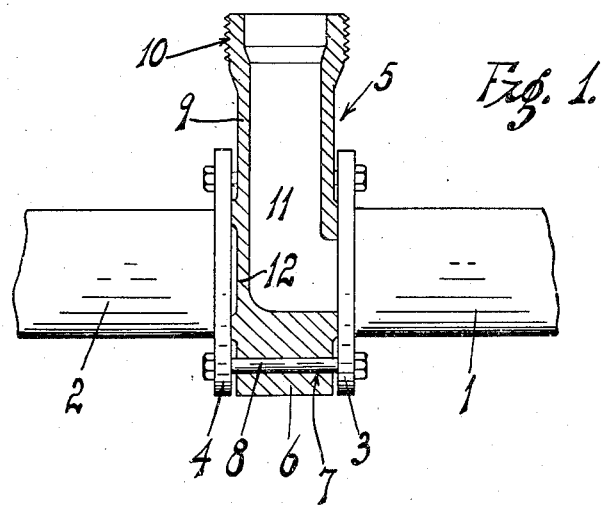
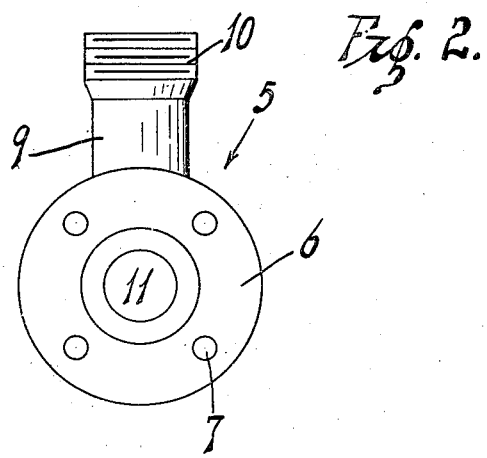
INVENTOR.
George A. Duggan.
BY
ATTORNEY.

Patented Feb. 22, 1949

2,462,731

UNITED STATES PATENT OFFICE 2,462,731

DIVERSION BLIND FITTING

George A. Duggan, Long Beach, Calif.

Application October 24, 1946, Serial No. 705,341

1 Claim. (Cl. 285—205)

This invention relates to a diversion blind fitting whereby the flow of fluid in a pipe line can be diverted around a length of pipe where it is desired to work.

An object of my invention is to provide a simple, effective and inexpensive line fitting which can be inserted in a pipe line and to which other pipe can be coupled, thus diverting the flow of fluid from the pipe line to some distant point.

Another object of my invention is to provide a novel diversion blind fitting which can be inserted between the coupling flanges of adjacent pipe sections, and when so positioned, the fitting will block off the flow in the pipe, and will divert that flow through the fitting, and thence into pipe coupled thereto.

A feature of my invention is to provide a novel diversion blind fitting which can be easily mounted by means of bolts between the coupling flanges of a pipe line.

Other objects, advantages and features of invention may appear from the accompanying drawing, the subjoined detailed description and the appended claim.

In the drawing:

Figure 1 is a transverse sectional view of my diversion blind fitting, the adjacent pipe sections being shown in elevation.

Figure 2 is an end view of my diversion blind fitting.

Referring more particularly to the drawing, adjacent pipe sections are shown at 1 and 2, and these pipe sections are formed with coupling flanges 3 and 4 respectively. If it is necessary to work on the pipe section 2, for example, and still permit the flow of fluid in the pipe line, my diversion blind fitting 5 is mounted between the sections 1 and 2, and between the flanges 3 and 4, the fluid being diverted in the fitting and directed to a distant point, thus enabling the workmen to work on the pipe section 2, and without the annoyance of fluid flowing through the pipe section which is being worked upon.

The diversion blind fitting 5 consists of a substantially circular body section 6, a plurality of bolt holes 7 extend through the body and bolts 8 extend through the flanges 3 and 4, and through the holes 7, thus securely mounting the fitting between said flanges.

A pipe extension 9 projects from the body 6 of the fitting 5, and is formed with threads, a flange or other suitable pipe coupling means 10, so that a pipe can be attached thereto, directing the flow of fluid from the pipe section 1 to a distant point. A fluid duct 11 extends angularly through the fitting 5 substantially as shown, and carrying the fluid from the pipe section 1, as previously described. The duct 11 extends through one side of the body 6 only, the other side being closed or blanked off as shown at 12. If a section of a pipe line breaks, or for some other reason it becomes necessary to work on the section of the pipe, my diversion blind fittings are mounted ahead of and back of the area of the pipe line which is being worked upon. The flow in the pipe line is thus diverted through the fitting, and thence into a parallel pipe and then back again into the original pipe line.

Having described my invention, I claim:

A diversion blind fitting for a pipe line, having flanged joints, said fitting comprising a body, said body having bolt holes extending laterally therethrough, said bolt holes matching holes in the flanged joints of the pipe line, whereby the body is mounted in the pipe line, a pipe extension extending from the body, and integrally formed therewith, means on the pipe extension to which a pipe is attached, said pipe extension and body having a duct extending therethrough, said duct extending through one side of the body only, and a solid wall on the other side of the body whereby the entire flow through the pipe line is directed through said duct.

GEORGE A. DUGGAN.

REFERENCES CITED

The following references are of record in the file of this patent:

UNITED STATES PATENTS

| Number | Name | Date |
| --- | --- | --- |
| 486,383 | Mercader | Nov. 15, 1892 |

FOREIGN PATENTS

| Number | Country | Date |
| --- | --- | --- |
| 652,294 | France | Mar. 6, 1929 |